March 13, 1962 W. A. SCOVILLE 3,024,818
APPARATUS FOR CUTTING AND SORTING LUMBER AND METHOD
Filed Aug. 24, 1959 5 Sheets-Sheet 3

INVENTOR.
WRIGHT A. SCOVILLE
BY
Boykin, Mohler & Wood
ATTORNEYS

March 13, 1962 W. A. SCOVILLE 3,024,818
APPARATUS FOR CUTTING AND SORTING LUMBER AND METHOD
Filed Aug. 24, 1959 5 Sheets-Sheet 4

INVENTOR.
WRIGHT A. SCOVILLE
BY
Buckhorn, Mohler & Wood
ATTORNEYS

United States Patent Office 3,024,818
Patented Mar. 13, 1962

3,024,818
APPARATUS FOR CUTTING AND SORTING
LUMBER AND METHOD
Wright A. Scoville, 20 S. Barnaberg, Medford, Oreg.
Filed Aug. 24, 1959, Ser. No. 835,755
12 Claims. (Cl. 144—309)

This invention relates to apparatus for cutting and separating or sorting lumber and has for one of its objects the provision of apparatus adapted to automatically separate from each other pieces of lumber of different lengths after sawing, including short scrap pieces of indeterminate lengths, and to carry such pieces away along different paths of travel for ultimate piling or otherwise handling such pieces.

In a normal operation the logs are first sawed into strips of the desired thickness or thicknesses and these are then ripped to the desired widths. Finally clear lengths are cut from the strips that are so ripped, and the lengths so cut usually are of predetermined lengths, which may be for filling orders of different lengths. It is necessary to cut out of the ripped pieces such sections as may have flaws or knots therein, and these sections are relatively short.

In apparatus heretofore used, these short pieces must be removed from the saw table by hand since they are not of sufficient length to reach what are known as "kickers" that are adapted to be actuated for kicking the sawed lengths laterally thereof off the saw table. Also, in conventional apparatus heretofore used the lengths of lumber, after cutting are not separated from each other, hence they must subsequently be sorted out according to length, and separated from the scrap or short defective or undesirable pieces.

The time and labor heretofore required to perform the above operations has been quite extensive and expensive.

It is one of the objects of this invention to provide apparatus adapted to reduce the time and expense of cutting and sorting to a fraction of that heretofore required, and to also reduce the number of hazards to workmen that have heretofore been present in the cutting and sorting of lumber.

Other objects and advantages will appear in the description and in the drawings.

In the drawings.

FIG. 6 is an enlarged sectional view taken along line 6—6 of FIG. 3.

FIG. 7 is a sectional view taken along line 7—7 of FIG. 6.

FIG. 8 is a fragmentary perspective view of the cut-off saw illustrating the scrap kicker kicking off a piece of scrap.

Figure 1:
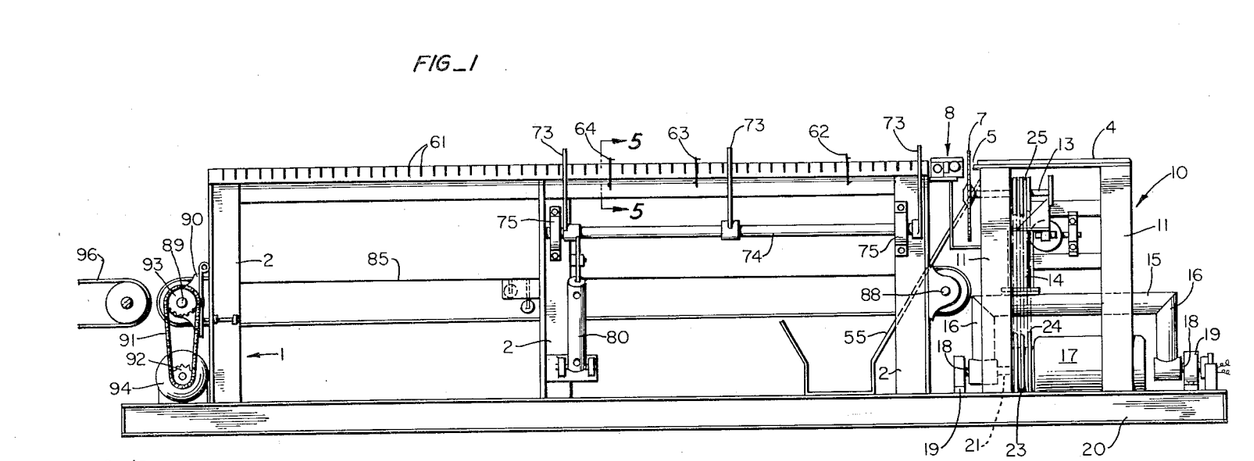
FIG. 1 is an elevational view of a side of the apparatus as seen from the side at which the operator stands, the latter having his station at the right-hand end of the apparatus shown.

In detail, referring to FIG. 1 the apparatus herein illustrated comprises a frame generally designated 1, that includes legs 2 supporting a horizontally elongated receiving table 3 thereon, and at the right hand end of receiving table 3 (FIG. 3) at approximately the same level as the receiving table 3 is a feed table 4, separated from the receiving table by the transversely extending gap 5 in which the circular swing saw 7 is adapted to move for transversely cutting a length of lumber adapted to be moved longitudinally thereof from the feed table onto the receiving table to a position spanning said gap.

The major length of the receiving table 3 is stationary, but between the saw 7 and the end of table 3 that is adjacent thereto is the scrap kicker generally designated 8, and which kicker includes a horizontal platform 9 (FIGS. 3, 8) that is at approximately the same level as table 3 and in longitudinal alignment with the table 3. Thus a length of lumber that may rest on tables 3, 4 and across gap 5 will also extend across platform 9 which is directly adjacent to the saw 7 and one edge of which platform defines one of the sides of said gap 5 that is at said receiving table and that is at the side of the gap next to the receiving table.

While the same frame 1 may be connected with the feed table, the latter, including the saw 7 and its mounting means may be separate from the table 3 and supported on a frame (FIG. 1) generally designated 10 that includes legs 11 supporting said feed table 4. Also, the feed table 4 may be of any desired length in a direction longitudinally of the receiving table 3 and of any desired width. Preferably it is of substantially greater width than that of the receiving table, since the pieces of lumber may move across table 4 to the operator in a direction transversely of the length of table 3. Any auxiliary support may be used in combination with table 4 to assist in supporting long pieces of lumber that are to be moved longitudinally thereof onto the receiving table 3 and across the path of travel of saw 7.

Figure 10:
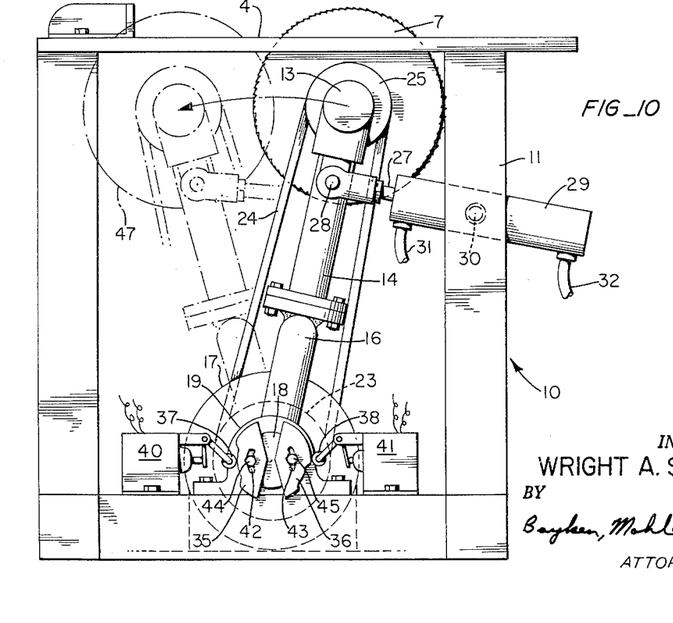
FIG. 10 is an elevational view of the cut-off saw and adjustable cams for actuating micor-switches that, in turn, control the length of the forward travel of the saw and actuation of the scrap kicker or the main kicker, according to position of other switch means in the electrical circuit.

Referring to FIGS. 1 and 10, the saw arbor 13 carrying saw 7 is rotatably supported on the upper end of a generally vertically extending post 14, which post, in turn, is secured at its lower end on the closed end 15 (FIG. 1) of an inverted U-shaped member having downwardly extending legs 16 that straddle a motor 17. The lower ends of the legs 16 carry coaxial oppositely outwardly extending stub shafts 18 journalled for rotation in coaxial bearings 19 secured to the base 20 of frame 10.

The motor drive shaft 21 is coaxial with the said stub shafts 18 and carries a multi-pulley 23 which, in turn, is connected by V-belts 24 with a similar pulley 25 on the saw arbor for rotating the saw 7. This structure permits swinging of the saw during rotation thereof.

As seen in FIG. 10 a piston rod 27 is pivotally connected at one end thereof at 28 with the post 14, and the piston on the opposite end of the rod 27 is reciprocable within an air cylinder 29 that, in turn, is pivotally secured at 30 to one of the frame posts 11. Air lines 31, 32 extend to and open into opposite ends of the cylinder for alternate admission and exhaust of air to and from opposite ends of the cylinder for swinging said saw about the axis of shafts 18.

A conventional solenoid actuated valve 127 indicated in the wiring diagram (FIG. 11) connects the lines 31, 32 with a source of power and a vent for controlling the admission of air into the ends of cylinder 29 and the exhaust therefrom.

Secured on one end of one of the shafts 18 are a pair of opposedly facing adjustable cams 35, 36 (FIG. 10). These cams have cam surfaces on their oppositely facing sides that, in turn, are engaged by cam followers 37, 38. These cam followers are respectively secured to micro-switches 40, 41 in the electrical circuit of the electrical diagram (FIG. 11) which will later on be explained in detail.

The cams 35, 36 will rock with the stub shaft 18 to which they are secured, and said cams may be adjusted to different positions relative to each other circumferentially about the axis of shafts 18. The cams are formed with arcuately extending slots 42, 43 through which the cam securing bolts 44, 45 threadedly extend into the end of the one shaft 18 for tightly clamping the said cams to the shaft. Slots 42, 43 are along lines that are concentric with the axis of the shaft 18 and upon loosening either or both of the bolts 44, 45 the cams may be moved about the said axis and reclamped rigid with the shaft 18 in adjusted position.

Said cams have low portions, and rises on which the followers 37, 38 will ride for actuating the micro-switches at the transition between the low portions and the rises. Actuation of one switch 40 causes actuation of a solenoid valve that controls the stroke of the saw while actuation of the other micro-switch 41 occurs at the other end of the stroke and actuates the sorting system to "set" it for a sorting operation. The full line position of the saw as seen in FIG. 10 is its preparatory to making a cutting stroke, and the dot-dash line position 47 of the saw in FIG. 10 is the position of the saw at the completion of its cutting stroke. When it completes the stroke, the kickers are actuated for removing the portion sawed off by the saw, and that is positioned on table 3, or platform 9, or both.

Referring to the auxiliary kick-off device 8, a mounting block 49 (FIG. 8) is rigid on the frame 1 and this block carries a horizontal air cylinder 50 that is secured at one of its ends thereto. This cylinder is connected at its opposite ends with air lines 51, 52 for alternate admission and discharge of air to the ends of the cylinder to effect reciprocation of the piston rod 53.

Cylinder 50 and its piston rod 53 extend at right angles to the length of table 3, and the piston rod 53 reciprocably extends through block 49 and is connected with a vertical plate 54 that is normally adjacent to the adjacent vertical side of the block 49. This plate 54 is rigidly connected at its lower end with one of the side edges of the platform 9.

As already mentioned, the platform 9 is relatively short in direction longitudinally of the table 3.

Figure 11:
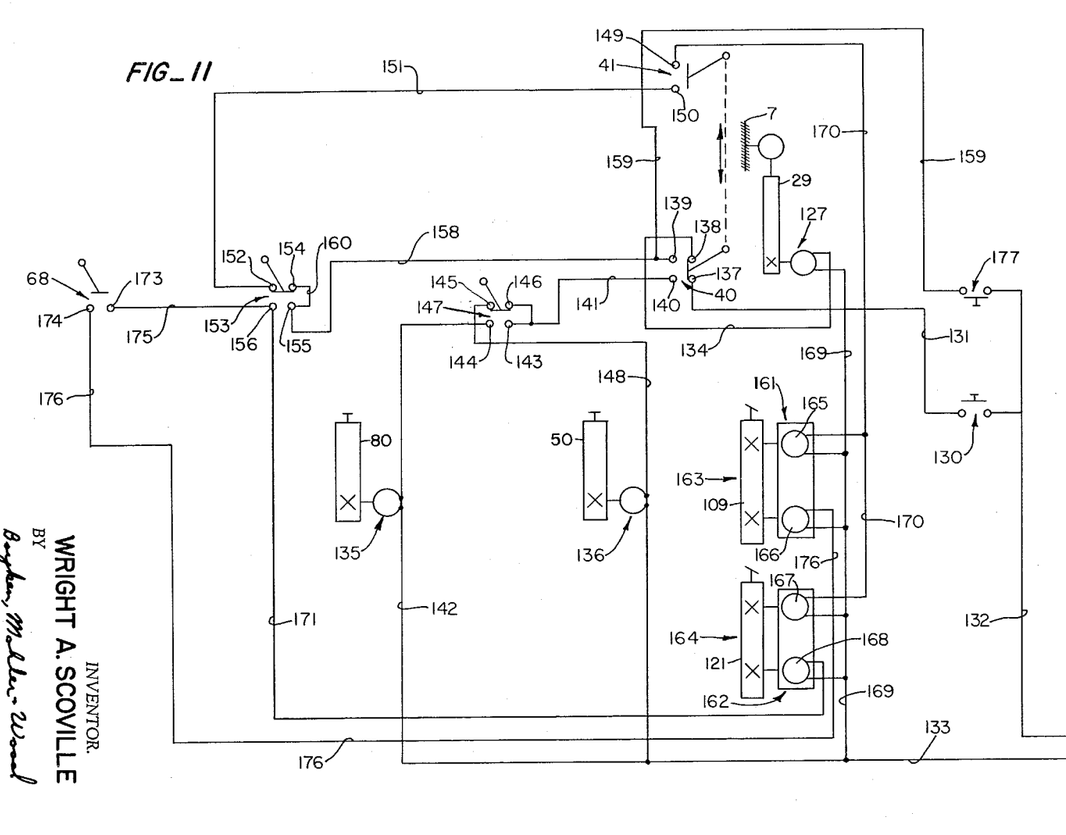
FIG. 11 is a schematic view of the electrical circuit.

Upon actuation of a suitable switch in the electrical circuit of FIG. 11 a solenoid valve will be actuated to sharply move the platform and plate transversely of the length of table 3, with the plate leading, to thereby kick any scrap material on said platform laterally of the path of travel of the lumber, and onto a scrap chute 55 (FIG. 1) for separating the scrap from lumber of value.

The table 3, as already mentioned, is horizontally elongated and is long enough to support thereon the longest pieces for which there is a demand.

This table 3 may actually be a combination of a wooden strip 56 (FIG. 6) secured on the horizontal leg of an angle strip 57 that is part of frame 1, and the upper side of the leg 58 of a T-strip disposed on its side so that one of the arms 59 of the head of such T-strip extends upwardly to provide a vertical fence along one side of table 3, while the other arm 60 projects downwardly and is coplanar with arm 59. Actually the upstanding arm 59 is preferably shorter than the downwardly projecting arm 60.

The arms 59 will be called the "fence," since the lumber that is sawed off will lie against it, but the vertical thickness of the lumber is greater than the height of the fence.

Figure 5:
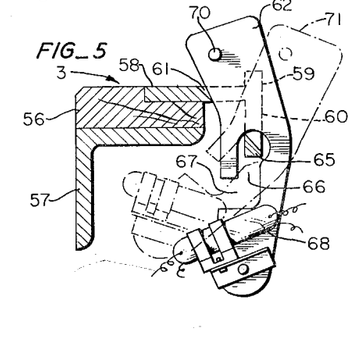
FIG. 5 is an enlarged fragmentary sectional view taken along line 5—5 of FIG. 1.

The portion of the leg 58 of the T-strip that carries the head, consisting of arms 59, 60, projects laterally from the strip 56, the latter being rabbeted along one edge to receive the outer end of the leg 58 with the upper surfaces of the strip 56 and leg 58 flush (FIG. 5).

Said projecting portion of the leg and the arms 59, 60 are slotted at 61, preferably at one inch intervals in direction at right angles to the T-strip, for receiving therein stop plates generally designed 62 (FIG. 5). There may be as many as desired of these stop plates, but they are normally positioned predetermined distances from saw 7 that are equal to the lengths of the usable pieces to be cut. The scrap is not considered.

A cross piece 65 of arm 60 (FIG. 5) remains at the lower end of arm 60 when the slots are formed, and the stop plates 62 are pivotally supported on these pieces 65. Each stop plate is disposed in a plane perpendicular to the length of the table 3 and said plate is formed with a recess 66 therein at a point intermediate its ends. Each recess 66 has a closed upper end that fulcrums on the piece 65. This recess has a lateral side opening 67 at its lower end to admit the piece 65, and below this opening 67 a mercury switch 68 is secured to the lower end of the plate or stop 62.

The upper portion of the stop plate 62 extends angularly toward the table 3 relative the lower end portion of said stop plate, and said upper portion threadedly carries a pin 70 that extends through the plate with its head at the side facing the saw 7. This pin may be releasably secured in any adjusted position with its head projecting a predetermined distance toward said saw 7. A lock nut may be on each pin 70 to insure against loosening accidentally.

The stop plates 62 normally will be pivotally supported so that their edges at the table side of the fence 59 of the T-strip are spaced from said fence in a direction across the table. The operator at the saw will slide the lumber to be cut on the wooden strip 56 to approximately the desired distance and will then move the strip laterally against the fence 59 causing the stop plates that may be alongside the length of lumber to swing to the dot-dash line position 71 of FIG. 5 thereby swinging the mercury switch 68 to a position in which the mercury will move to the opposite end of its housing. The length of lumber may then be moved longitudinally to engage the head on the pin 70 that is on the stop plate that is ahead of said length, and the saw will then be actuated to saw the lumber to a length equal to the distance between the head of the pin 70 that is so engaged by the end of the lumber piece and the saw.

The "kickers" are generally designated 73 (FIGS. 1 and 6). FIG. 1 shows three of these kickers 73 at equally spaced points along a horizontal shaft 74 that is parallel with the table 3 and which shaft is rotatably mounted at its ends on bearings 75 carried by the frame legs 2. These kickers are vertically elongated metal strips each having a lateral projection or striker head 76 (FIG. 6) at its upper end. The lower ends of the kickers are secured to shaft 74.

An arm 77, also secured at one end to shaft 74 projects laterally outwardly and downwardly and its outer end is pivotally connected at 78 (FIG. 6) with the upper end of a piston rod 79 that extends downwardly into an air cylinder 80. The lower end of said air cylinder 80 is pivotally connected with a bracket on frame 1. Air lines 82, 83 connect with opposite ends of said cylinder to effect reciprocable movement of the piston on rod 79, whereby the striker arm will be caused to quickly swing its striker head 76 toward table 3 for engagement with the laterally facing side of a length of lumber that may be on table 3 and against the fence 59 to kick such piece laterally away from the fence and off the table 3 and to the side of said table that is opposite to the fence 59.

Along the side of table 3, and at a substantially lower level, are a plurality of spaced endless conveyors 85, 86, 87 that have their upper runs coplanar in a horizontal plane. These conveyors are supported at one of their ends on coaxial pulleys on a shaft 88 (FIG. 1), which shaft, in turn, may be supported in bearings on legs 2 of frame 1 or on any other suitable portion of the frame, at the end of the frame that is adjacent to saw 7.

The opposite ends of the conveyors may be on coaxial pulleys on a shaft 89 that may, in turn, be carried on take-up bearings 90 on the end of the frame 1 opposite to saw 7. The conveyors may be driven by a sprocket chain 91 connecting sprocket wheels 92, 93 respectively on the motor shaft of a motor 94 and on shaft 89. Obviously, if desired, any variable speed transmission or reducer gear box may be between sprocket wheel 92 and the motor shaft so as to regulate the speed of the conveyors.

Said conveyors are actuated so that their upper runs will move in a direction away from the saw 7. These upper runs may be supported on rigid tables in the conventional manner as seen in FIG. 6 for supporting lumber thereon without causing the belts to sag under the weight of the lumber (FIG. 6).

Preferably, in longitudinal alignment with the belts 85, 86, 87 is another set of belt conveyors 96, 97, 98 (FIG. 2), which belts extend over coaxial pulleys at their ends that are adjacent to conveyors 85, 86, 87. These pulleys may be secured on a common shaft connected in any suitable manner, such as described by the drive for conveyors 85, 86, 87, with a motor for driving said conveyors 96, 97, 98 in the same direction as conveyors 85, 86, 87.

Figure 2:
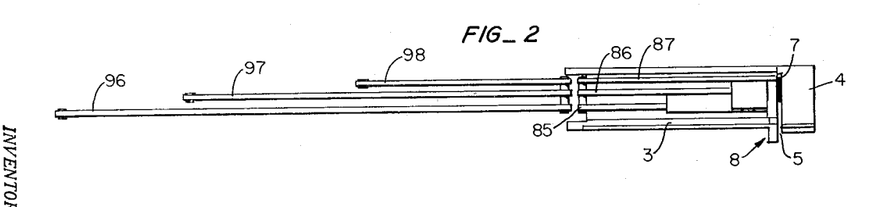
FIG. 2 is a greatly reduced, semi-diagrammatic plan view of the apparatus shown in FIG. 1 including a series of conveyors extending different distances to the left of the apparatus.

These conveyors 96, 97, 98 preferably terminate at different distances from the conveyors 86—87 and each extends over a separate pulley at its outer terminating end. For example, conveyor 96 may extend say twenty feet beyond the terminating end of conveyor 97, and conveyor 97 may terminate approximately twenty feet beyond the conveyor 98. These are practical distances, although the invention is not intended to be necessarily restricted to these exact figures.

Figure 9:
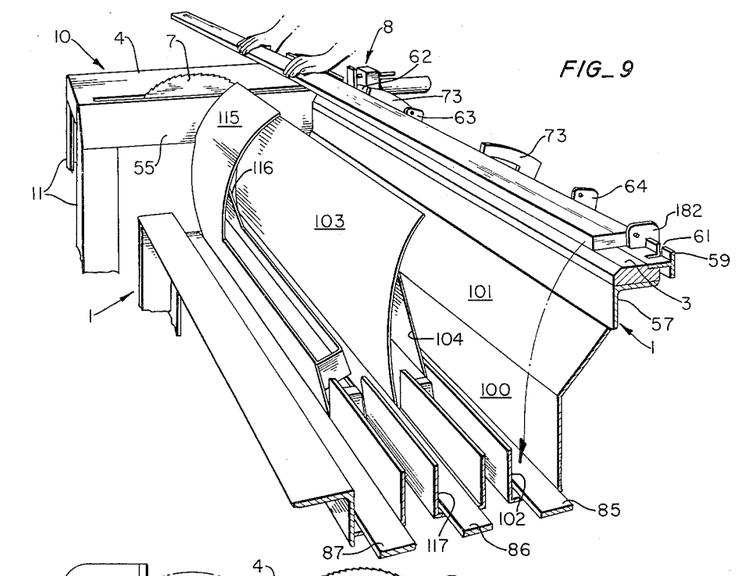
FIG. 9 is a more extended fragmentary perspective view than is shown in FIG. 8 illustrating the sorting feature of the invention for the longer lengths of usable lumber.

The upper runs of conveyors 85, 86, 87 are disposed in channels that extend from the end of the apparatus remote from the saw toward the saw. The inner side of each channel will be considered as the side nearest the table 3 as seen in FIGS. 6, 9.

The conveyor 85 has its upper run in the channel adjacent to table 3, and the inner side 100 of this inner channel may extend the length of table 3, with an upward extension 101 that extends slantingly to the angle strip 57 that carries the table 3.

The outer side 102 of the inner channel in which the upper run of conveyor 85 extends terminates at its upper edge much lower than the upper edge of the extension 101 or wall 100, and said outer side may also extend the length of table 3.

Figure 3:
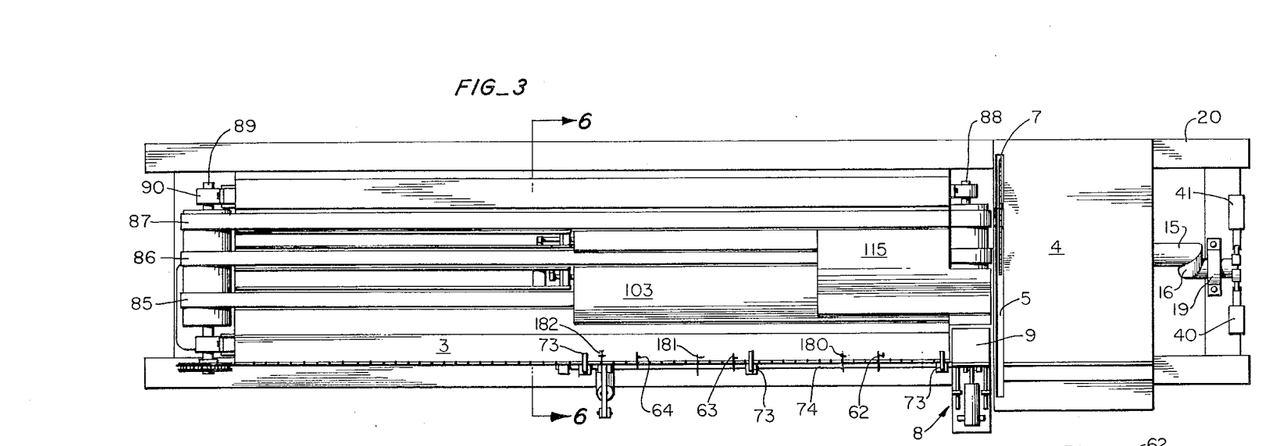
FIG. 3 is a top plan view of the apparatus shown in FIG. 1 including the separators and conveyors for different lengths of cut lumber.
Figure 4:
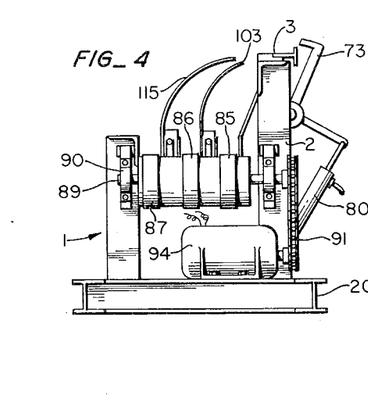
FIG. 4 is an end view of the apparatus shown in FIG. 3 as seen from the left hand end.

A horizontally extending gate plate 103 extends from the saw-end of the apparatus toward the opposite end for a distance that may be approximately the length of the shaft 74 that mounts the kickers, which is approximately one-half the length of the apparatus, as seen in FIG. 3. This gate 103 extends arcuately upwardly from its lower edge in a direction toward the table 3, and said lower edge of the plate is along the inner edge of the upper run of the middle conveyor 86.

At the concave side of the gate 103 is a plate 104 that is rigid with plate 103 and that extends upwardly from the outer side 102 of the inner channel in which the upper run of the inner conveyor 85 is positioned. Thus gate 103 and plate 104 are a unit, the former virtually constituting the inner side of the channel in which the upper run of the middle conveyor 86 is positioned for the length of gate 103, while the plate 104 is an upward extension of the outer side 102 of the inner channel.

The gate comprising plates 103 and 104 is secured adjacent to and between their lower edges to a rotatably supported horizontal shaft 105 extending longitudinally of the apparatus.

A vertically extending arm 106 is secured at its upper end to shaft 105, and the lower end of said arm is pivotally connected at 107 to the outer end of a piston rod 108. This rod 108 extends into air cylinder 109, which cylinder, in turn, is pivotally mounted at its end opposite to rod 108 to a bracket 110 that is rigid with frame 1.

Air lines 111 and 112 connect with opposite ends of the cylinder 109 for alternately admitting and exhausting air into the cylinder to effect reciprocable movement of the piston rod 108, and consequent swinging of the gate consisting of plates 103 and 104.

In the position shown in FIG. 6 the inner gate 103 is in a closed position, in which the upper edge of gate 103 is substantially below the level of table 3, and any length of lumber kicked off table 3 would pass over the upper edge of gate 103.

Between the upper runs of the middle conveyor 86 and the outer conveyor 87 is a second gate assembly comprising an arcuately upwardly extending plate 115 that is vertically wider than gate 103, and this gate extends from the saw end of the apparatus toward the opposite end only about half the length of the gate 103, although it may be as long as desired.

The lower edge of gate 115 is adjacent to the inner edge of the upper run of the outer conveyor 87, and a vertical plate 116 similar to plate 104 extends upwardly in continuation of the outer side 117 of the channel in which the upper run of the middle conveyor 86 is disposed.

A shaft 118 parallel with shaft 105 and approximately between the lower ends of gate 115 and plate 116 is secured to said plates as at 114 (FIG. 7) and is rotatably supported at its ends in bearings 113 carried by frame 1.

A vertically extending arm 119 (FIGS. 6, 7) is secured at its upper end by pin 99 to shaft 118 and is pivotally connected, by pivot 128, at its lower end to the outer end of a piston rod 120 that, in turn, extends into one end of an air cylinder 121. The opposite end of cylinder 121 is pivotally connected with a bracket 122 secured to frame 1. Air lines 123, 124 connect with opposite ends of the cylinder for alternately admitting and discharging air respectively into and from the cylinder to effect reciprocation of rod 120 and consequent swinging of the gate assembly 115 consisting of gate 115 and plate 116.

In the position indicated in FIG. 6 the gate 115 is also in closed position, hence whatever length of lumber on table 3 that is kicked therefrom will pass over the upper edges of the gates 103 and 115 and will slide down the convexly curved side of gate 115 onto the upper run of the conveyor 87.

It should be noted that the stationary sides of the channels in which the upper runs of the conveyors 85, 86, 87 are positioned extend from the two separators above described to the end of the apparatus that is remote from the saw (FIG. 9).

Preferably the longest pieces of lumber are to be kicked into the inner conveyor that is nearest to the table, but to do this the gates 103, 115 must be swung at their upper ends away from the table 3, and when so swung, said upper ends move upwardly and will intercept the piece of lumber kicked off the table, so it will be guided and deposited onto the upper run of the inner conveyor 85.

If the piece of lumber is to be deposited onto the middle conveyor, then only the gate 115 is swung at its upper end away from table 3, and the piece of lumber kicked off the table will be guided and deposited onto the upper run of the middle conveyor 86.

In the various views, in full line, the apparatus is in a normal starting position. The saw 7 is in its "back" position preparatory to forward movement, and in this position, the micro-switch 41 is closed and the micro-switch 40 is open (FIG. 10).

Referring again to the scrap kicker 8, this has a rod 6 (FIG. 8) above the piston rod and parallel therewith that supports the kicker against rotation about a horizontal axis.

The fact that conveyors 96, 97 and 98 (FIG. 2) terminate different distances from the ends of the conveyors 85–87 enables an operator to remove and to stack the lumber onto separate pallets without interference. The long, middle and short pieces otherwise would arrive at the end of a single conveyor in indeterminate order and the scraps would also be carried along with the rest.

In a normal operation the pieces of lumber may be automatically discharged over the ends of the conveyors 96–98 for automatic piling onto a pallet positioned at the end of and beyond each conveyor, or an operator alongside each conveyor could manually handle the pieces. In either instance, the advantage of terminating the conveyors at different distances to facilitate handling the lumber is believed to be apparent.

It is also to be noted that the arrangement of the gates 103, 115 is such that the lighter or shorter pieces will be kicked onto the farthest conveyor, while the middle length pieces will go onto the middle conveyor, and the heavy longest pieces will go onto the conveyor nearest table 3. This is desirable to avoid having to make kickers of unusually high impact characteristics.

Also, while three kickers are shown, apart from the scrap kicker, there may be any number of these, and several may be closer together at the end adjacent to the saw, if desired, to insure against any likelihood of the piece being turned by the kicker.

Saw Operation

The saw motor 17 and conveyor motors are continuously operating until stopped by manual actuation of switches in their respective circuits.

The actuation of a solenoid valve 127 (FIG. 11) in the air lines 31, 32 to air cylinder 29 (FIG. 10) will control the air flow to actuate the piston in said cylinder for causing a forward movement of saw 7 through its forward, sawing stroke, and upon the saw completing the sawing operation, the current to the solenoid valve 127 will be broken at switch 10 and the solenoid armature will be returned by a conventional spring to reverse the flow of air in the air lines 31, 32 for returning the saw to its original full line position.

A normally open foot actuated switch 130 (FIG. 11) is in electrical line 131 that, in turn, is connected with the line 132 of the incoming power lines 132, 133.

The line 131 extends to one terminal 137 of the micro-switch 40, and the other terminal 138 of said switch being connected by line 134 with one of the terminals of the solenoid valve 127. The other terminal of the solenoid of said valve connects with the power line 133. Thus upon closing switch 130 the solenoid valve 127 will be actuated to admit air under pressure through air line 32 leading to the outer end of air cylinder 29 (FIG. 10) to cause the forward movement of the saw through the piston connection between the saw and said cylinder. Upon the saw completing its cutting stroke, the micro-switch 40 will be actuated through its follower-cam connection with shaft 18 to break the circuit in line 134 (FIG. 11) by disconnecting terminals 137, 138 and closing terminals 139, 140, since this switch is of the two-circuit type. The breaking of the circuit 134 results in the spring urged return of the solenoid of valve 127 to reverse the flow of air in lines 31, 32 so that the saw will be returned back to its full line position, in FIG. 10.

Terminals 139, 140 of micro-switch 40 function, when closed, and under certain circumstances, to close circuits in which solenoid valves 135 and 136 are connected. Solenoid valve 135 is connected in air lines 82, 83 that, in turn, are connected with air cylinder 80 (FIG. 6) that actuates the stock kickers 73, and solenoid valve 136 is connected in air lines 51, 52 that communicate with the ends of cylinder 50 for activating the scrap kicker 8 (FIG. 8).

The Stock Kickers

The stock kickers 73 are actuated by the actuation of piston rod 79 in cylinder 80 (FIG. 6). Solenoid valve 135 is in air lines 82, 83 and controls the flow of air through said lines, and consequently the direction of movement of the piston rod 79.

Upon micro-switch 40 opening the circuit in which the saw solenoid valve 127 is positioned, it will close the circuit in which solenoid valve 135 (FIG. 11) is positioned for actuating the latter by connecting terminals 139, 140.

Terminal 140 connects electrical lines 141, 142 through terminals 143, 144 at one end of the mercury switch 147, which switch is on stop plate 62 nearest to saw 7. Solenoid valve 135 is in line 142, and upon the actuation of said solenoid valve, the air in line 82 (FIG. 6) is admitted to cylinder 80 for actuating piston rod 79 and the kicker 73 to move the lumber on table 3 laterally off said table. Since stop plate 62 will be engaged by any piece of lumber on table 3 that is cut off, the kickers 73 will be actuated as long as a piece of lumber is past the saw and is against the first stop plate for swinging it to a dot-dash line position corresponding to position 71 of FIG. 5. However, unless such lumber extends past stop plate 63, the gates 103, 115 will not be actuated, hence the piece that is cut will be kicked onto conveyor 87.

When no lumber is on table 3 of sufficient length to extend past stop plate 62, the terminals 145, 146 at one end of the mercury switch 147 (which is on the stop plate 62) will remain closed, since the stop plate is not actuated.

Upon the saw swinging back to its starting position, the connection between terminals 139, 140 will be broken and the conventional spring in solenoid valve 135 will restore the solenoid to its original position in which the air supply to cylinder 80 will be controlled to return kickers 73 to their original positions.

Scrap Kicker

Solenoid valve 136 (FIG. 11) is in the air lines 51, 52 (FIG. 8) that connect with air cylinder 50 for actuation of piston rod 53, which rod, in turn, connects with the scrap kicker 8 for actuating the latter.

Electrical line 148 connects the terminal 145 of mercury switch 147 with the solenoid valve 136 and with power line 133 when none of the mercury switches on the stop plates 62, 63, 64 are actuated by lumber in engagement therewith. Therefore when the micro-switch 40 is actuated to close terminals 139, 140 at the end of a cutting stroke of the saw, the solenoid 136 will be actuated for actuating the scrap kicker 8.

This scrap kicker, as has heretofore been mentioned, is actuated only when none of the mercury switches on the stop plates are actuated by the movement of lumber thereagainst, and normally they are not actuated when a small faulty portion, such as a knot, for example, is in a piece of lumber and is cut out. Such pieces never react the stop plates that carry mercury switches, although at this point it should be made plain that there may be stop plates used that do not carry switches.

Gates 103, 115

Both gates 103, 115 should be down, or closed, at the beginning of each sawing operation, or upon return of the saw to its rear starting position.

At the commencement of each sawing operation the micro-switch 41 (FIG. 11) that is actuated through the movement of cam 36 and follower 38 (FIG. 10) is open, but it will be closed upon the saw moving forwardly to its forward position 47. The terminals 149, 150 (FIG. 11) of micro-switch 41, when closed by actuation of the shaft 18, will connect line 170 with a line 151. Line 151 is connected through mercury switch 153, line 158 and line 159 to power line 132. Line 170 is connected through solenoid valves 165, 167 to line 169 which in turn is connected to power line 133 thereby completing the circuit which maintains gates 103, 115 in a closed position upon the return of the saw to its rear starting position. Mercury switch 153 is on stop plate 63 and is identical with mercury switch of FIG. 5. The other terminal 154 at the same end of the switch 153 is normally connected by the mercury in said switch with terminal 152 when the switch is in a full line position such as is indicated in FIG. 5 for switch 68.

The other terminals 155, 156 at the other end of switch 153 are open until the switch 153 is tilted by engagement with a piece of lumber on table 3 being drawn against the fence 59.

The terminal 155 of switch 153 is connected by lines 158, 159 to the incoming power line 132 and terminals 154, 155 of the switch 153 are connected at all times by a line 160.

There are two sets 161, 162 of double solenoid valves 163, and 164 for the air lines of cylinders 109 and 121 (FIG. 6). The solenoids of set 161 are designated 165 and 166, and the solenoids of set 162 are designated 167, 168.

One of the terminals of solenoids 165, 167 are connected with a line 169 that connects one terminal of the saw solenoid 127 with power line 133. The other terminal of the saw solenoid, as has been already noted, connects by lines 131 and 134 with the other power line 132 when the micro-switch 40 is in a position connecting terminals 137, 138 thereof.

The other terminal of each of the solenoids 165, 167 is connected by a line 170 with the terminal 149 of the micro-switch 41. These solenoids 165, 167 are the ones that move the gates 103, 115 to closed positions, and they will be actuated to close the gates when switch 41 is closed and mercury switch 153 which is on the stop plate 63 is in its normally inoperative position in which its terminals 152, 154 are connected. This completes the circuit to the other power line 132.

The solenoids 166, 168, when actuated, function to reverse the flow of air to cylinders 109, 121 to open the gates 115, 103.

When the mercury switch 153 on stop plate 63 is tilted by the engagement with a piece of lumber, it will close the terminals 155, 156, thus opening the circuit to the solenoids 165, 167, and closing it for solenoid 168 through line 171 with the result that air is admitted through line 123 (FIG. 6) into air cylinder 121 to actuate the piston rod 120 for opening the gate 115, so that the actuation of the kickers will result in the piece of lumber on table 3 being deflected by the gate 115 onto conveyor 86.

The stop plate 64 carries a mercury switch 68 and the terminals 173, 174 of this switch normally open unless it is actuated by movement of a piece of lumber against the same in the manner described for the other mercury switches. Since this switch is farthest removed from the saw 7 it will be seen that it requires a longer piece of lumber to extend past it. When switch 153 also is actuated, line 175 will connect terminal 156 of switch 153 with line 176 that extends to the other terminal of solenoid 166 and this solenoid will be actuated to cause gate 103 to be swung open, whereby the piece of lumber that actuated switch 68 will be kicked onto conveyor 85.

It is obvious that the mercury switches 147, 153 and 68 will all be restored to the positions indicated in FIG. 8 when any piece of lumber that has been cut is kicked into its proper place.

In power line 132 there is preferably a normally closed switch 177 which may be foot actuated to de-energize all of the solenoids except the saw solenoid to permit non-sorting operations to be performed.

*Sorting Operation*

As an example of a practical operation, on fence 59 there may be stop plates 180, 181 and 182 (FIG. 3) that are respectively beyond each of the stop plates 62, 63 and 64, and which plates 180—182 do not carry mercury switches, but are set at specific and desired distances from the saw 7. Each of these plates is identical in every other respect with the plates 62, 63, 64.

Assuming that 2-foot, 4-foot and 6-foot pieces were to be cut and sorted, the stop plates 180, 181, 182 will be positioned in the slots that are 2 feet, 1 inch; 4 feet, 1 inch; and 6 feet, 1 inch from the saw, and then the bolts or screws in each plate are adjusted to extend say seven-eighths of an inch from each plate toward the saw. Thus a piece of lumber may be moved along the fence until its outer end is near to the plate 180 and then moved against the fence and longitudinally until its outer end abuts the bolt head.

This movement of the piece against the fence will actuate only the mercury switch 147 on the stop plate 62, since the latter is between the stop plate 80 and the saw, and as soon as the saw reaches the end of its cutting stroke the piece will be kicked over gates 103 and 115 onto conveyor 87.

Assuming a 4-foot piece is to be cut, the stop plate 181 will be positioned at say 4 feet, 1 inch from the saw and its bolt will be screwed toward the saw say seven-eights of an inch so the distance between the bolt and saw is substantially 4 feet from the saw. The one-eighth inch allowance in each instance may approximately equal the set of the saw so the piece that is cut will be exactly 4 feet in length, or so close to that length as to be a negligible difference.

Upon the piece of lumber tilting the plates 62, 63 that carry mercury switches 147, 153, the solenoid 168 will be actuated to move gate 115 to elevated position to intercept the 4-foot piece of lumber that has been cut, and the piece will be kicked onto conveyor 86.

When a 6-foot piece is cut, the stop plate 182 beyond plate 64 may be adjusted so its bolt will be substantially six feet from the saw, and when plates 62, 63 and 64 that carry mercury switches 147, 153 and 68 are actuated, both gates 115 and 103 will be actuated and the 6-foot piece will be kicked onto conveyor 85, as seen in FIG. 9.

It is obvious that the plates 62, 63, 64 may be positioned at any desired distances from the saw, and it is equally obvious that any number of stop plates corresponding to plates 180, 181 and 182 may be used, since any lengths between the saw and the first plate 180 that will actuate the switch 147 will be kicked onto conveyor 87, hence the apparatus may be used to segregate lumber coming within maximum and minimum length in three ranges.

In explanation of the terms "leading end portion" or "leading end portions" as used herein and in the claims, it is to be understood that such term includes any portion of, or the entire portion of a strip of lumber that is in a position on the table 3 or the section 9 thereof that has been moved past the saw in the direction of travel of such strip.

I claim:

1. The method of cutting and sorting portions of lumber of different lengths cut from single strips thereof that comprises the steps of; intermittently moving each of said strips longitudinally thereof in one direction along a horizontally extending path of travel past a fixed point to different distances of the leading end of each of said strips from said point, then cutting off the leading end portion of each strip at said point during the interval between each movement of the strip in said direction and immediately thereafter moving the leading portion that has been cut off laterally from said path to one of several different distances from said path according to the length of the leading portion that is so moved whereby said leading portions will be sorted according to their lengths.

2. The method of cutting and sorting portions of lumber of different lengths cut from single strips thereof that comprises the steps of; intermittently moving each of said strips longitudinally thereof in one direction along a horizontally extending path of travel past a fixed point to different distances of the leading end of each of said strips from said point, then cutting off the leading end portion of each strip at said point during the interval between each movement of the strip in said direction and immediately thereafter moving the leading portion that has been cut off laterally from said path to one of several different distances from said path according to the length of the leading portion that is so moved whereby said leading portions will be sorted according to their lengths, and thereafter moving the leading portions that have been so removed from said path longitudinally thereof along separate paths of travel to separate discharge points from said separate paths.

3. The method of cutting and sorting portions of lumber of different lengths cut from single strips thereof that comprises the steps of; intermittently moving each of said strips longitudinally thereof in one direction along a horizontally extending path of travel past a fixed point to different distances of the leading end of each of said strips from said point, then cutting off the leading end portion of each strip at said point during the interval between each movement of the strip in said direction and immediately thereafter moving the leading portion that has been cut off laterally from said path to one of several different distances from said path according to the length of the leading portion that is so moved whereby said leading portions will be sorted according to their lengths, and thereafter moving the leading portions that have been so removed from said path along separate paths different distances from their point of removal from said path to separate discharge points, and discharging said leading portions from said separate paths on top of each other at said discharge points.

4. In apparatus for cutting and sorting different lengths of lumber the combination of; horizontally elongated supporting means adapted to support a horizontally disposed strip of lumber thereon for movement of said strip longitudinally thereof in one direction in a horizontally extending path, a saw at a point along said path and adjacent to said supporting means supported for movement transversely of and through a strip on said supporting means, a portion of said supporting means being a relatively short section thereof positioned at and closely adjacent to the same side of said saw as the leading end portion of said strip when the latter is moved in one said direction along said path and its said leading end portion projects past said saw, means supporting said section of said supporting means for movement laterally from a supporting position supporting said leading end portion in said path to a discharge position offset laterally relative to said path for discharging said leading end portion laterally from said path and back to said supporting position, means connected with said section for so moving the latter.

5. In apparatus for cutting and sorting different lengths of lumber the combination of; horizontally elongated supporting means adapted to support a horizontally disposed strip of lumber thereon for movement of said strip longitudinally thereof in one direction in a horizontally extending path, a saw at a point along said path and adjacent to said supporting means supported for movement transversely of and through a strip on said supporting means, a portion of said supporting means being a relatively short section thereof positioned at and closely adjacent to the same side of said saw as the leading end portion of said strip when the latter is moved in one said direction along said path and its said leading end portion projects past said saw, means supporting said section of said supporting means for movement laterally from a supporting position supporting said leading end portion in said path to a discharge position offset laterally relative to said path for discharging said leading end portion laterally from said path and back to said supporting position, means connected with said portion for so moving the latter, said section of said supporting means including a horizontal platform, and the means supporting said platform for its said movement including an elongated member extending horizontally in a direction at right angles to said path and connected at one end thereof with said platform, means supporting said member for reciprocable movement longitudinally thereof whereby said platform will be carried laterally of said path together with lumber supported thereon upon movement of said member in one direction longitudinally thereof.

6. Apparatus for cutting and sorting different lengths of lumber comprising; supporting means for supporting a strip of lumber for movement longitudinally thereof in one direction along a path of travel, a saw supported at a point along said supporting means for movement transversely of and through a strip on said supporting means, means supporting said saw for said movement, means connected with said saw for so moving it, said supporting means including a section thereof adjacent to said saw at one side thereof separate from the remainder of said supporting means, means mounting said section for movement transversely of said path and relative to said remainder of said supporting means for carrying any lumber thereon away from said remainder of said supporting means and out of said path, means connected with said section for so moving it, said portion being at the same side of said saw as the leading end of a strip of lumber that is moved past said saw in said one direction.

7. Apparatus for cutting and sorting different lengths of lumber from strips of lumber moved longitudinally thereof in one direction, comprising the combination of; a plurality of separate horizontally extending conveyors in side by side relation, elongated supporting means alongside and parallel with said conveyors adapted to support a strip of lumber thereon for movement of said strip longitudinally thereof in a direction along a path parallel with said conveyors, a saw at a point along said supporting means supported for movement transversely through a strip adapted to be supported on said supporting means for cutting off the leading end portion of said strip relative to said one direction of movement of said strip, strip removing means adjacent to said supporting means at the same side of said saw as said leading end portion, said strip removing means being supported for movement transversely of said supporting means into engagement with such leading end portion of lumber cut off by said saw and across said supporting means for removing said leading end portion laterally from said supporting means, and onto one of said conveyors, said conveyors being positioned to so receive such leading end portion, separate guide means adjacent to each conveyor movable from a position blocking entry of such leading end portion onto the conveyors to a position guiding such leading end portion thereonto and means engageable by the leading portion cut off by said saw for actuating said guide means according to the length of the leading end portion whereby leading end portions of different lengths will be guided onto different of said conveyors.

8. Apparatus for cutting and sorting different lengths of lumber from strips of lumber moved longitudinally thereof in one direction comprising, the combination of; elongated horizontally extending supporting means adapted to support each of said strips thereon for said movement, a saw adjacent to one end of said supporting means movable for cutting the leading end portion from each strip when the latter is moved in said one direction onto said supporting means over said one end thereof, separate movable strip engaging means along one side of said supporting means at different spaced distances from said saw respectively adapted to be moved only by a leading end portion of sufficient length to extend from said saw therepast whereby the number of said strip engaging means so moved will be according to the length of the leading end portion cut from said strip, kicker means adjacent to said supporting means actuatable upon completion of a cut by said saw for movement into engagement wtih a lateral side of said leading end portion and across said supporting means for moving said leading end portion off said supporting means to one side thereof, means actuated by movement of said saw at the end of its sawing stroke for effecting actuation of said kicker means, and movable sorting devices alongside said supporting means selectively actuated according to the number of said strip engaging means that are engaged by said leading end portion for guiding said leading end portions to different locations according to their lengths, and means connecting said strip engaging means with said sorting device for causing said selective actuation of said sorting device.

9. Apparatus for cutting and sorting different lengths of lumber from strips of lumber moved longitudinally thereof in one direction comprising, the combination of; elongated horizontally extending supporting means adapted to support each of said strips thereon for said movement, a saw adjacent to one end of said supporting means movable for cutting the leading end portion from each strip when the latter is moved in said one direction onto said supporting means over said one end thereof, separate movable strip engaging means along one side of said supporting means at different spaced distances from said saw respectively adapted to be moved only by a leading end portion of sufficient length to extend from said saw therepast whereby the number of said strip engaging means so moved will be according to the length of the leading end portion cut from said strip, kicker means adjacent to said supporting means actuatable upon completion of a cut by said saw for movement into engagement with a lateral side of said leading end portion and across said supporting means for moving said leading end portion off said supporting means to one side thereof, means actuated by movement of said saw at the end of its sawing stroke for effecting actuation of said kicker means, and movable sorting devices alongside said supporting means selectively actuated according to the number of said strip engaging means that are engaged by said leading end portion for guiding said leading end portions to different locations according to their lengths, and means connecting said strip engaging means with said sorting device for causing said selective actuation of said sorting device, separate movable monveyor means at each of said different locations for conveying said leading end portions to different discharge points for stacking the end portions at said discharge points.

10. Apparatus for cutting and sorting different lengths of lumber from strips of lumber moved longitudinally thereof in one direction comprising, the combination of; elongated horizontally extending supporting means adapted to support each of said strips thereon for said movement, a saw adjacent to one end of said supporting means movable for cutting the leading end from said strip when the latter is moved in said one direction onto said supporting means over said one end thereof, separate movable strip engaging means along one side of said supporting means at different spaced distances from said saw respectively adapted to be moved only by a leading end portion of sufficient length to extend from said saw therepast whereby the number of said strip engaging means so moved will be according to the length of the leading end portion cut from said strip, kicker means adjacent to said supporting means actuatable upon completion of a cut by said saw for movement into engagement with a lateral side of said leading end portion and across said supporting means for moving said leading end portion off said supporting means to one side thereof, means actuated by movement of said saw at the end of its sawing stroke for effecting actuation of said kicker means, and movable sorting devices alongside said supporting means selectively actuated according to the number of said strip engaging means that are engaged by said leading end portion for guiding said leading end portions to different locations according to their lengths, and means connecting said strip engaging means with said sorting device for causing said selective actuation of said sorting device, separate movable conveyor means at each of said different locations for conveying said leading end portions to different discharge points for stacking the end portions at said discharge points, said conveyor means extending longitudinally of said leading end portions and movable longitudinally of said end portions for carrying them endwise along separate paths, and said conveyor means being in side by side relation in a row and terminating at said discharge points at successively greater distances from said sorting devices whereby an operator along a lateral side of each conveyor means adjacent to its discharge point may remove each of said leading end portions laterally therefrom for stacking alongside said conveyor means.

11. Apparatus for cutting and sorting different lengths of lumber from strips of lumber moved longitudinally thereof in one direction comprising, the combination of; a saw supported for back and forth movement along a generally horizontal path for sawing off the leading end portion from a strip of lumber extending across said path upon movement of said saw in one direction, horizontally elongated and horizontally disposed supporting means extending at right angles to said path away from one side of said saw with one end thereof adjacent to said saw for supporting said leading end portion of such strip thereon during the cutting stroke of said saw, said supporting means including a stationary table spaced from said saw at said one side thereof and a movable table between said stationary table and said saw in horizontal alignment with the latter, said movable table being actuatable for movement from a horizontal supporting position in said horizontal alignment with said stationary table to a discharge position offset laterally relative to said stationary table in which a piece of lumber thereon is discharged therefrom, and means actuatable by movement of said saw at the end of its cutting stroke connected with said movable table for actuating the latter for movement to said discharge position and movable means along said stationary table actuatable by movement of a piece of lumber extending from said saw to a point on said stationary table past said movable means for rendering said means actuatable by said saw inoperative for actuating said movable table, whereby said movable table will be actuated for movement only by a piece of lumber shorter than one sufficiently long to extend from said saw past said movable means.

12. The method of separating cut lumber of different lengths from each other following the cutting thereof to said different lengths that comprises the steps of: successively supporting said lengths horizontally in a corresponding location with a corresponding end of each length at the same point whereby the other ends of said lengths of lumber will be at different points for different lengths thereof, then knocking each piece so positioned bodily and laterally from its said location to different distances from said location substantially inversely proportional to the lengths of said pieces in that the pieces of greater lengths are moved shorter distances from said location than are the pieces of shorter lengths, and then moving said pieces from said different distances longitudinally thereof along separate paths to different points.

(References on following page)

References Cited in the file of this patent

UNITED STATES PATENTS

| | | |
|---|---|---|
| 957,779 | Leaver | May 10, 1910 |
| 996,386 | Williams | June 27, 1911 |
| 1,220,799 | Tanner | Mar. 27, 1917 |
| 1,574,445 | Robinson | Feb. 23, 1926 |
| 2,527,024 | Mitchell | Oct. 24, 1950 |
| 2,662,640 | Dedo | Dec. 15, 1953 |
| 2,742,935 | Acton | Apr. 24, 1956 |

FOREIGN PATENTS

| | | |
|---|---|---|
| 161,633 | Sweden | Dec. 10, 1957 |